United States Patent
Gons

(10) Patent No.: US 11,421,593 B2
(45) Date of Patent: Aug. 23, 2022

(54) REMOVABLE AIR FILTER ASSEMBLIES FOR AIRCRAFT

(71) Applicant: Textron Innovations Inc., Providence, RI (US)

(72) Inventor: William Mathisen Gons, Dallas, TX (US)

(73) Assignee: Textron Innovations Inc., Providence, RI (US)

( * ) Notice: Subject to any disclaimer, the term of this patent is extended or adjusted under 35 U.S.C. 154(b) by 324 days.

(21) Appl. No.: 16/743,572

(22) Filed: Jan. 15, 2020

(65) Prior Publication Data

US 2021/0215097 A1    Jul. 15, 2021

(51) Int. Cl.
| | |
|---|---|
| B01D 46/10 | (2006.01) |
| B01D 46/88 | (2022.01) |
| B64D 33/02 | (2006.01) |
| F02C 7/04 | (2006.01) |
| F02M 35/14 | (2006.01) |

(52) U.S. Cl.
CPC .............. *F02C 7/04* (2013.01); *B01D 46/103* (2013.01); *B01D 46/88* (2022.01); *B64D 33/02* (2013.01); *B01D 2275/206* (2013.01); *B64D 2033/0246* (2013.01); *F02M 35/14* (2013.01)

(58) Field of Classification Search
CPC . F02C 7/055; F02C 7/04; B64D 33/02; B64D 2033/0246; B01D 46/008; F02M 35/02416; F02M 35/048; F02M 35/16
See application file for complete search history.

(56) References Cited

U.S. PATENT DOCUMENTS

| | | | | |
|---|---|---|---|---|
| 5,662,292 A * | 9/1997 | Greene | .................. | B64D 33/02 244/53 B |
| 5,697,394 A * | 12/1997 | Smith | .................... | B64D 33/02 137/15.1 |
| 2005/0229558 A1* | 10/2005 | Stelzer | ................... | B01D 46/10 55/385.3 |
| 2011/0265650 A1* | 11/2011 | Kazlauskas | ............. | F02C 7/052 55/306 |
| 2014/0158833 A1* | 6/2014 | Braeutigam | ........... | B64D 33/02 96/405 |
| 2016/0207634 A1* | 7/2016 | Boyce | ..................... | F02C 7/055 |

* cited by examiner

*Primary Examiner* — Joshua J Michener
*Assistant Examiner* — Ka Chun Leung
(74) *Attorney, Agent, or Firm* — Lawrence Youst PLLC

(57) ABSTRACT

An air intake system for an aircraft engine includes an air duct having an inlet port to provide fluid communication between the inlet port and the engine and a removable air filter assembly configured to interface with the inlet port of the air duct and a skin of the aircraft. The air filter assembly includes an air filter frame having an outer wall and an inner wall, the outer wall of the air filter frame forming an air filter slot. The air filter assembly also includes a bypass door forward of the air filter slot and an air filter insertable into the air filter slot. The bypass door is movable between a closed door position and an open door position, air flowing to the inlet port of the air duct via the air filter in the closed door position and bypassing the air filter in the open door position.

19 Claims, 8 Drawing Sheets

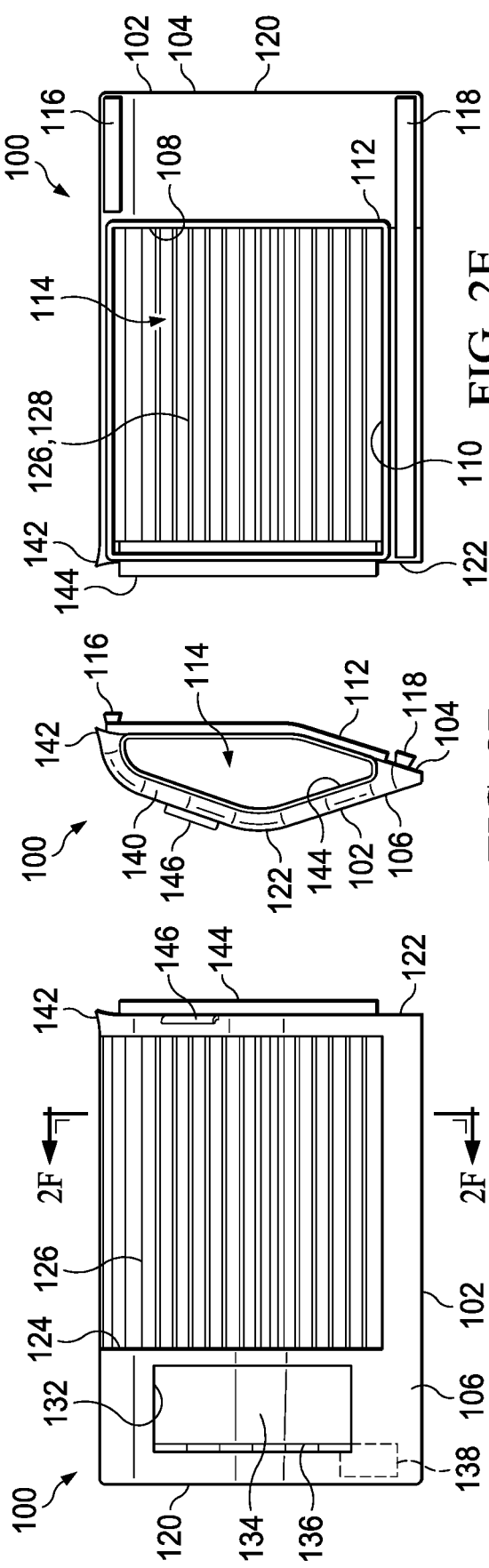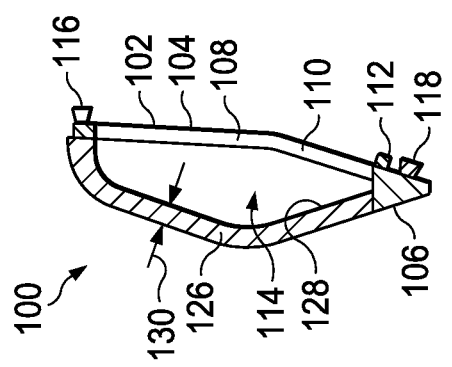

REMOVABLE AIR FILTER ASSEMBLIES FOR AIRCRAFT

TECHNICAL FIELD OF THE DISCLOSURE

The present disclosure relates, in general, to air intake systems for use on aircraft and, in particular, to air filter assemblies having an air filter and an air filter frame configured for convenient installation on and removal from the inlet port of an air duct based on operational conditions.

BACKGROUND

Aircraft engines rely on a steady supply of air for proper operation. For example, in a gas turbine engine of a helicopter, a compressor receives and compresses air that is then fed into a combustion chamber into which atomized fuel is injected. The resulting fuel and air mixture is ignited and allowed to expand to form a combustion gas, which then rotates a series of turbine wheels. The turbine wheels provide power to the main rotor system through an output shaft. Reciprocating engines also rely on a clean air supply. In reciprocating engines, when each piston moves away from the cylinder head on the intake stroke, the intake valve opens and a fuel and air mixture is drawn into the combustion chamber. As the piston moves back toward the cylinder head, the intake valve closes and the fuel and air mixture is compressed. When compression is nearly complete, the spark plugs fire and the compressed fuel and air mixture is ignited to begin the power stroke. The rapidly expanding gases from the controlled burning of the fuel and air mixture drive the piston away from the cylinder head, thus providing power to rotate a crankshaft.

Aircraft fly through a wide variety of environmental conditions including austere environmental conditions containing particulates such as dust, sand, dirt and rocks. Aircraft include air intake systems to ensure that the engine receives a clean supply of air in the varied operational environments encountered by the aircraft. More particularly, air intake systems may employ an air filter to prevent particulates from entering and interfering with the operation of the engine, thus prolonging engine life and improving aircraft performance. While the use of an air filter is effective in preventing particulates from reaching the engine, especially at low altitudes or in high particulate environments such as a desert, air filters can also adversely affect aircraft performance by inhibiting the supply of air to the engine and lowering the top speed of the aircraft. This drawback of air filters is especially pronounced during high speed flight in high altitude environments, which typically have a lower particulate concentration than low altitude environments. Current air intake systems employ permanently or semi-permanently attached air filters that must be installed or removed at an aircraft maintenance facility, precluding the pilot or crew from installing or removing the air filter based on real-time operational conditions such as weather. For example, many current helicopters employ air filters that are bolted onto the fuselage. Such permanent and semi-permanent air filtration systems preclude the pilot or crew from removing the air filter in anticipation of clear environmental conditions in which an air filter is unnecessary. Accordingly, a need has arisen for removable air filter assemblies that may be conveniently installed or removed by the pilot or crew based on operational circumstances.

SUMMARY

In a first aspect, the present disclosure is directed to an air intake system for an engine of an aircraft including an air duct having an inlet port to provide fluid communication between the inlet port and the engine and a removable air filter assembly configured to interface with the inlet port of the air duct and a skin of the aircraft. The air filter assembly includes an air filter frame including an outer wall and an inner wall, the outer wall of the air filter frame forming an air filter slot. The air filter assembly also includes a bypass door forward of the air filter slot of the air filter frame and an air filter insertable into the air filter slot of the air filter frame. The bypass door is movable between a plurality of door positions including a closed door position and an open door position, air flowing to the inlet port of the air duct via the air filter in the closed door position and bypassing the air filter in the open door position.

In some embodiments, the inlet port of the air duct may form a convex filter interface edge and an aft end of the air filter assembly may form a concave inlet port interface edge. In certain embodiments, the inner wall of the air filter frame may form a cutout including one or more edges configured to couple to the aircraft skin to at least partially form an air plenum. In some embodiments, the air filter assembly may include a seal at the one or more edges of the cutout configured to seal the air filter assembly against the aircraft skin. In certain embodiments, the seal may be a rectangular seal around the cutout. In some embodiments, the outer wall of the air filter frame may form a bypass slot. In such embodiments, the bypass door may be coupled to the bypass slot and air may flow to the inlet port of the air duct via the bypass slot in the open door position. In certain embodiments, the bypass door may open toward the aircraft skin in the open door position. In some embodiments, the bypass door may be rotatably coupled to the outer wall of the air filter frame by a hinge at a forward end of the bypass door. In certain embodiments, the air filter assembly may include a bypass door actuator configured to move the bypass door between the plurality of door positions. In some embodiments, the bypass door may be a spring loaded bypass door biased to the closed door position, the spring loaded bypass door moving to the open door position when airflow against the spring loaded bypass door exceeds a threshold.

In certain embodiments, the air filter assembly may include an air plenum formed by the walls of the air filter frame, the air filter and the aircraft skin. In some embodiments, the air filter may have an inner concave wall to partially form the air plenum. In certain embodiments, the air filter assembly may include an aft bypass door aft of the air filter slot. In some embodiments, the air filter assembly may include an aft seal insertable into the inlet port of the air duct. In certain embodiments, the air intake system may include a lock configured to interface with a forward or aft end of the air filter assembly to secure the air filter assembly against the inlet port. In some embodiments, the air intake system may include an alignment tab and groove subsystem configured to align the air filter assembly with the inlet port of the air duct. In certain embodiments, the inner wall of the air filter frame may include one or more alignment tabs and the aircraft skin may form one or more alignment grooves, the one or more alignment tabs slidable along the one or more alignment grooves.

In a second aspect, the present disclosure is directed to an aircraft including an engine, a skin at least partially covering the engine and an air intake system configured to receive air for the engine. The air intake system includes an air duct having an inlet port to provide fluid communication between the inlet port and the engine and a removable air filter assembly configured to interface with the inlet port of the air duct and the skin. The air filter assembly includes an air filter frame including an outer wall and an inner wall, the outer wall of the air filter frame forming an air filter slot. The air filter assembly also includes a bypass door forward of the air filter slot of the air filter frame and an air filter insertable into the air filter slot of the air filter frame. The bypass door is movable between a plurality of door positions including a closed door position and an open door position, air flowing to the inlet port of the air duct via the air filter in the closed door position and bypassing the air filter in the open door position.

In some embodiments, the aircraft may be a helicopter including a fuselage and a main rotor system powered by the engine and the air duct may be coupled to the fuselage. In certain embodiments, the aircraft may be a tiltrotor aircraft including a fuselage supporting a wing having outboard ends and a nacelle including the engine and the air duct coupled to one of the outboard ends of the wing. In some embodiments, the air filter assembly may be shaped to contour the aircraft skin.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 2A-2F are various views of a removable air filter assembly in accordance with embodiments of the present disclosure;

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Figure 1A:
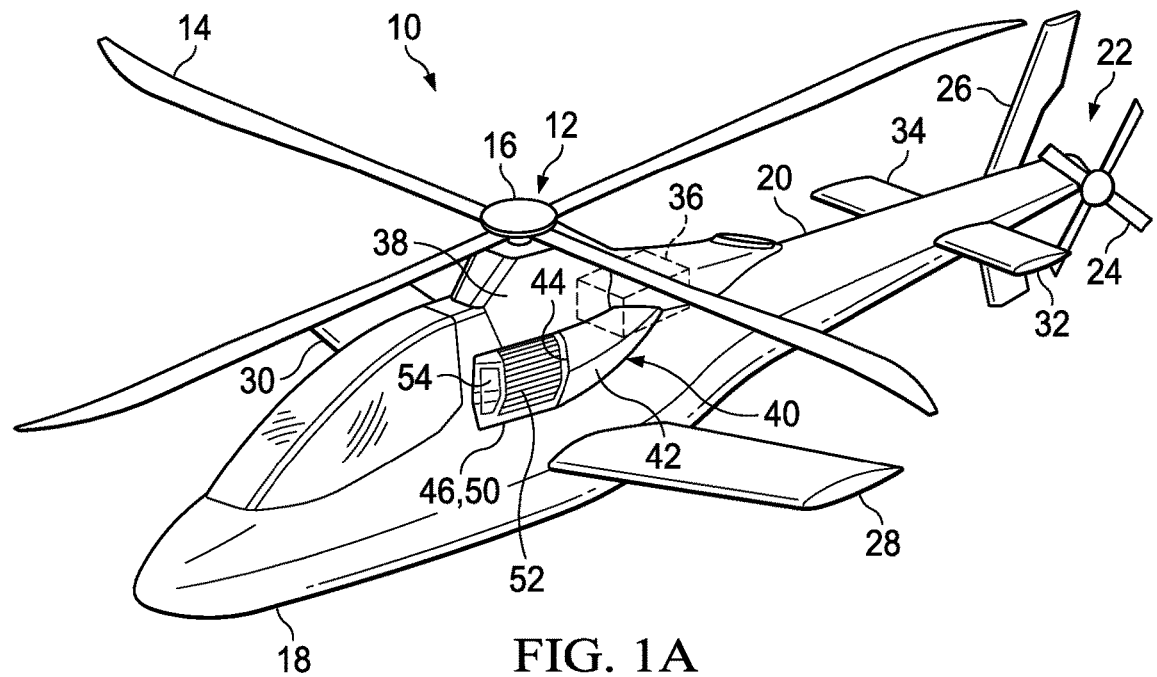
FIGS. 1A-1C are schematic illustrations of a helicopter including a removable air filter assembly in accordance with embodiments of the present disclosure.
Figure 1B:
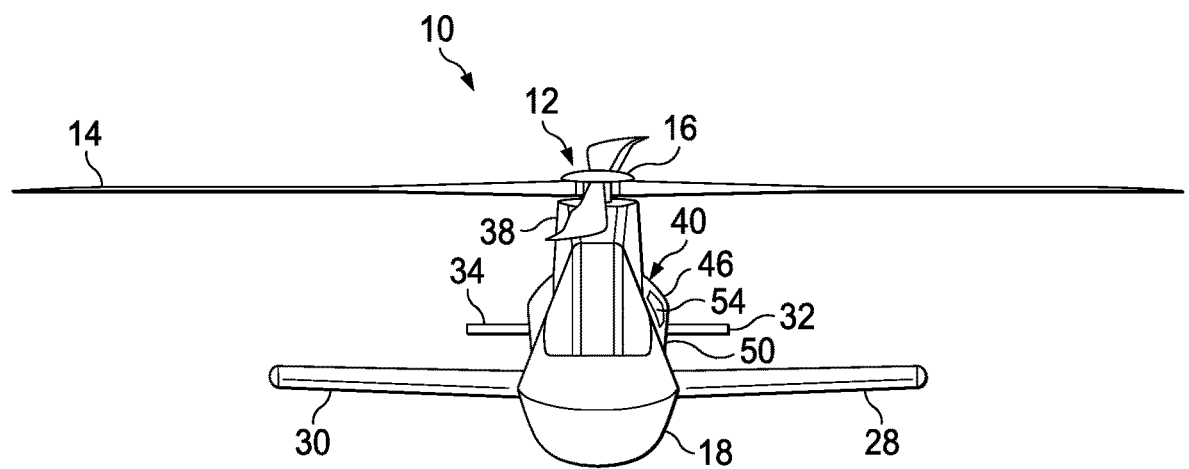
Figure 1C:
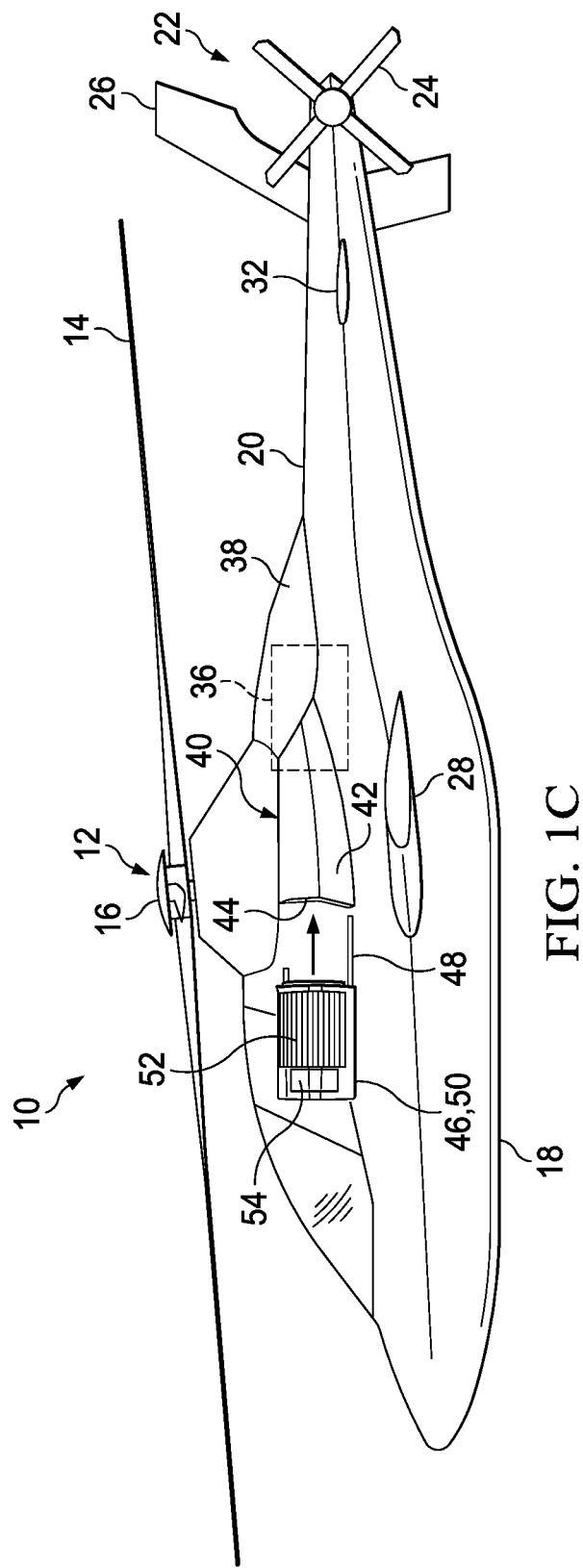
Figure 2B:
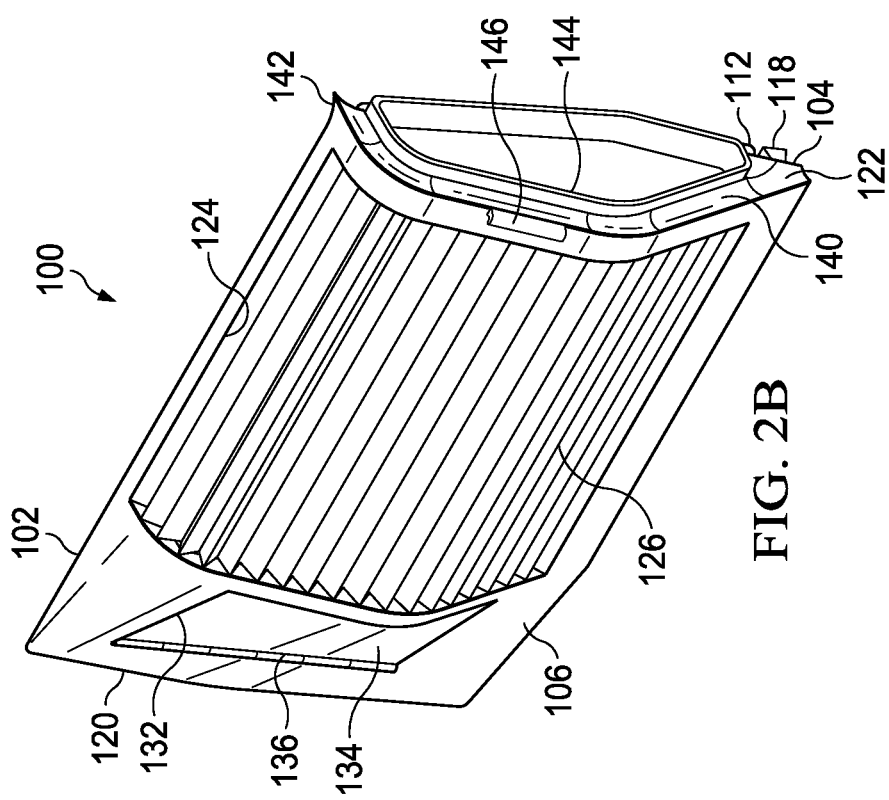
Figure 2A:
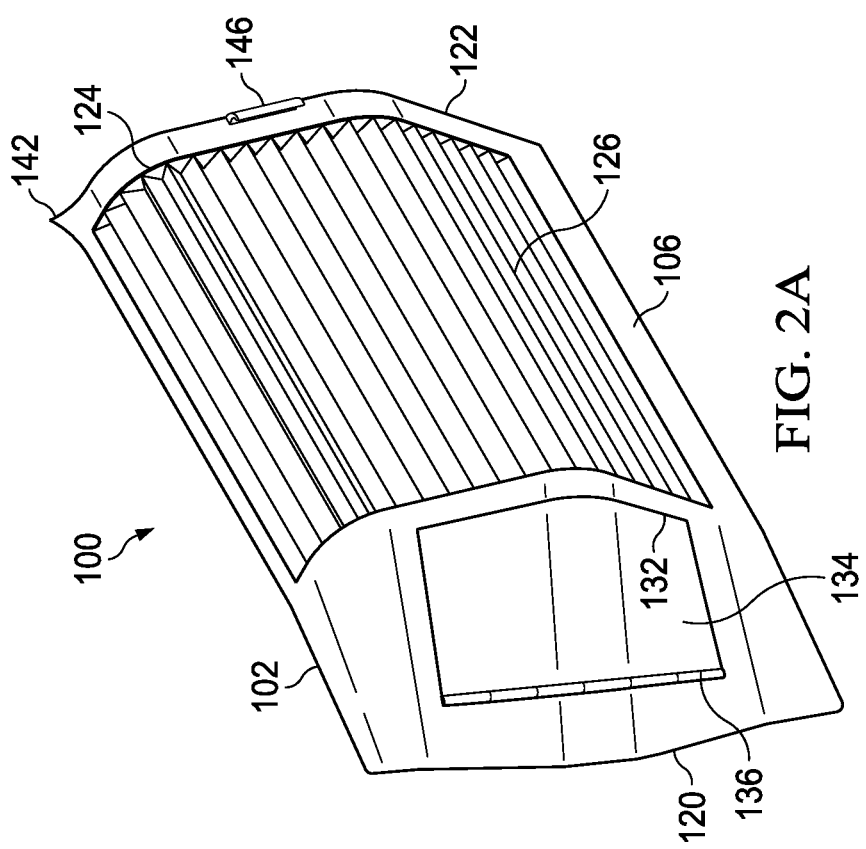

Referring to FIGS. 1A-1C in the drawings, a rotorcraft in the form of a helicopter is schematically illustrated and generally designated 10. The primary propulsion for helicopter 10 is a main rotor system 12. Main rotor system 12 includes a plurality of rotor blades 14 extending radially outward from a main rotor hub 16. Main rotor system 12 is coupled to a fuselage 18 and is rotatable relative thereto. The pitch of rotor blades 14 can be collectively and/or cyclically manipulated to selectively control direction, thrust and lift of helicopter 10. Collective control may be used to control the altitude and/or speed of helicopter 10 by simultaneously changing the pitch angle of all rotor blades 14 independently of their position. For example, during a stable hover, if pilot input is made to the collective control, the pitch angle of all rotor blades 14 changes simultaneously and equally, resulting in helicopter 10 either increasing or decreasing in altitude. A cyclic control may be used to control the attitude and/or direction of helicopter 10 by controlling the pitch of rotor blades 14 cyclically, that is, the pitch of each rotor blade 14 will vary during each rotation. The variation in pitch has the effect of varying the angle of attack of, and thus the lift generated by, each rotor blade 14 as it rotates. Thus, if the cyclic control is moved forward or backward, main rotor system 12 generates thrust in the forward direction or backward direction, respectively. Similarly, if the cyclic control is moved to the right or to the left, main rotor system 12 generates thrust in the right direction or left direction, respectively.

A tailboom 20 extends from fuselage 18 in the aft direction. An anti-torque system 22 includes a tail rotor assembly 24 coupled to an aft end of tailboom 20. Anti-torque system 22 controls the yaw of helicopter 10 by counteracting the torque exerted on fuselage 18 by main rotor system 12. In the illustrated embodiment, helicopter 10 includes a vertical tail fin 26 that provides stabilization to helicopter 10 during high speed forward flight. In addition, helicopter 10 includes wing members 28, 30 that extend laterally from fuselage 18 and wing members 32, 34 that extend laterally from tailboom 20. Wing members 28, 30, 32, 34 provide lift to helicopter 10 responsive to the forward airspeed of helicopter 10, thereby reducing the lift requirement on main rotor system 12 and increasing the top speed of helicopter 10. Main rotor system 12 and tail rotor assembly 24 receive torque and rotational energy from a main engine 36, which is disposed within a skin 38 of the airframe of helicopter 10. Main engine 36 is coupled to a main rotor gearbox (not shown) by suitable gearing, clutching and shafting. The main rotor gearbox is coupled to main rotor system 12 by a mast and is coupled to tail rotor assembly 24 by a tail rotor driveshaft. Main engine 36 may be an internal combustion engine such as a turboshaft engine or reciprocating engine.

Main engine 36 relies upon a sufficiently clean supply of air for efficient operation. Helicopter 10 includes an air intake system 40 to deliver air from the outside of helicopter 10 to main engine 36. Air intake system 40 includes an air duct 42 coupled to the left side of fuselage 18. Air duct 42 provides fluid communication, and airflow in particular, between inlet port 44 of air duct 42 and main engine 36. In the illustrated embodiment, air duct 42 is the only air duct for main engine 36 of helicopter 10. In other embodiments, a second air duct may be positioned to the right side of fuselage 18 that supplies air to main engine 36 and/or a second engine of helicopter 10 in a twin engine embodiment.

In high particulate operational conditions such as in low altitude flight or desert environments, particulates such as sand, dirt or dust enter the air intake systems of aircraft. Contaminated air from such environments can decrease engine life and reduce overall aircraft performance. In order to perform well in high particulate operational environments, previous aircraft have employed permanent or semi-permanent air filters as a barrier to the inlet port(s) of the air intake system. While such air filters keep out particulates and help maintain clean air intake into the engine, air filters that have been permanently or semi-permanently installed on the aircraft in an assembly or maintenance facility cannot be easily removed at the discretion of the pilot or crew. For example, one previous type of air filter is a bolt-on filter kit that may require the removal of the inlet port, air duct, skin or other hardware of the aircraft for proper installation. Because such permanently or semi-permanently attached air filters cannot be easily removed by the pilot or crew, the air filter must remain on the aircraft even in low particulate, high altitude or high speed environments in which the air filter can adversely impact the top speed of the aircraft. For example, the top speed of a helicopter may be lowered by 10 knots or more when an air filter is installed on the inlet port(s) of the air intake system.

To address the issues presented by the air filtration systems of previous aircraft, helicopter 10 includes an air filter assembly 46 that may be quickly and easily installed and removed at the discretion of the pilot or crew based on whether helicopter 10 should utilize an air filter for a particular flight or operational environment. Air filter assembly 46 is shaped to contour helicopter skin 38 and interfaces with inlet port 44 of air duct 42 and helicopter skin 38. Air filter assembly 46 may be slid into an installed position against inlet port 44 along grooves, or channels, 48. Together with complementary alignment tabs on air filter assembly 46, grooves 48 may form part of an alignment tab and groove subsystem that aligns air filter assembly 46 with inlet port 44 of air duct 42 and secures air filter assembly 46 against aircraft skin 38. Grooves 48 may be formed or built into helicopter skin 38 to accept the alignment tabs of air filter assembly 46. Once air filter assembly 46 is in the installed position, as shown in FIGS. 1A-1B, one or more quick connect couplings or latches may be used to secure air filter assembly 46 against helicopter skin 38 and inlet port 44. Air filter assembly 46 includes an air filter frame 50. Air filter frame 50 forms an air filter slot into which air filter 52 is inserted. Air filter 52 is removable from air filter frame 50 and may be interchanged or replaced when air filter 52 becomes dirty. Air filter assembly 46 includes a bypass door 54 forward of air filter 52 that may be closed to force air through air filter 52 and opened so that air filter 52 is bypassed.

Air filter assembly 46 facilitates easy and convenient installation on and removal from helicopter 10 and does not require the removal of components from helicopter 10 when being installed or removed. Thus, air filter assembly 46 may be conveniently installed to keep out dust, dirt, moisture and other particulates to maintain clean air intake into main engine 36 when high particulate operational environments are anticipated by the pilot or crew, thereby prolonging the life of main engine 36 and improving the overall performance of helicopter 10. Conversely, in circumstances in which higher speed flight and/or low particulate operational environments are anticipated, the pilot or crew may conveniently remove air filter assembly 46 from helicopter 10 so that air filter assembly 46 does not interfere with the performance of helicopter 10.

It should be appreciated that helicopter 10 is merely illustrative of a variety of aircraft that can implement the embodiments disclosed herein. Indeed, air filter assembly 46 may be implemented on any aircraft. Other aircraft implementations can include hybrid aircraft, tiltwing aircraft, tiltrotor aircraft, quad tiltrotor aircraft, unmanned aircraft, gyrocopters, propeller-driven airplanes, compound helicopters, jets, drones and the like. As such, those skilled in the art will recognize that air filter assembly 46 can be integrated into a variety of aircraft configurations. It should be appreciated that even though aircraft are particularly well-suited to implement the embodiments of the present disclosure, non-aircraft vehicles and devices can also implement the embodiments.

Referring to FIGS. 2A-2F in the drawings, an air filter assembly for an air intake system of an aircraft engine is schematically illustrated and generally designated 100. Air filter assembly 100 includes air filter frame 102 formed from an inner wall 104 and an outer wall 106. Inner wall 104 forms a cutout 108 having edges 110. A rectangular seal 112 positioned along edges 110 surrounds cutout 108 formed by inner wall 104. Seal 112 sealingly couples edges 110 of cutout 108 against the skin of an aircraft such that the aircraft skin provides the back wall to an air plenum 114 within air filter assembly 100. Seal 112 may be formed from a flexible material such as an elastomer or rubber. Cutout 108 and seal 112 may form shapes other than a rectangle including rounded shapes such as an oval or circle or irregular shapes.

Inner wall 104 includes upper and lower alignment tabs, or tongues, 116, 118, which are shaped to slide into corresponding grooves formed in the skin of the aircraft. Alignment tabs 116, 118 form part of an alignment tab and groove subsystem configured to align air filter assembly 100 with the inlet port of an air duct. Alignment tabs 116, 118 protrude from inner wall 104 to interface with the aircraft skin. Upper alignment tab 116 extends approximately from forward end 120 of air filter assembly 100 to cutout 108. Lower alignment tab 118 extends approximately from forward end 120 to aft end 122 of air filter assembly 100. Although alignment tabs 116, 118 are illustrated as having a trapezoidal cross-sectional shape, alignment tabs 116, 118 may have any cross-sectional shape capable of being slid, snapped, fastened or otherwise coupled to corresponding members or channels formed in the aircraft skin.

Outer wall 106 of air filter frame 102 forms an air filter slot 124 into which air filter 126 is insertable and interchangeable. Air filter slot 124 is disposed on the opposite side of air plenum 114 as cutout 108 such that air filter slot 124 and cutout 108 have substantially coextensive forward and aft edges. The forward and aft edges of air filter slot 124 are curved to accommodate the similarly curved profile of air filter 126. As best seen in FIG. 2F, which is a cross-sectional view of FIG. 2C taken along line 2F-2F, air filter 126 has a concave inner wall 128 to define one of the walls of air plenum 114. Thus, when air filter assembly 100 is installed on an aircraft, air plenum 114 is formed by walls 104, 106 of air filter frame 102, air filter 126 and the aircraft skin. Air filter 126 may be insertable into air filter slot 124 from any direction such as the sides or top of air filter assembly 100 including through cutout 108 of inner wall 104. Air filter 126 may be formed from any material suitable for filtering particulates from the air such as cotton fiber with impregnated oils and/or synthetic materials. A wire mesh may also be integrated with air filter 126 for structural stability and to rigidly form air filter 126 into a desired shape. Air filter 126 may have any thickness 130. In one non-limiting example, thickness 130 of air filter 126 may be in a range between one and two inches such as 1.5 inches.

Outer wall 106 of air filter frame 102 forms a bypass slot 132 forward of air filter slot 124. Bypass door 134 is rotatably coupled to outer wall 106 of air filter frame 102. More particularly, the forward edge of bypass door 134 is rotatably coupled to the forward edge of bypass slot 132 by a hinge 136. In other embodiments, however, edges other than the forward edge of bypass door 134 may be coupled to an edge of bypass slot 132. Bypass door 134 rotates about hinge 136 to either open or close bypass slot 132 to oncoming airflow during flight. When bypass door 134 is closed, as shown in FIGS. 2A-2F, air flows from the outside of air filter assembly 100 to air plenum 114 via air filter 126. When bypass door 134 is open, air flows to air plenum 114 via bypass slot 132 and bypasses air filter 126. Air filter assembly 100 may include a bypass door actuator 138 that rotates bypass door 134 about hinge 136 between the open and closed door positions. Bypass door actuator 138 may be manually engaged by the pilot or crew to open or close bypass door 134. In other examples, bypass door actuator 138 may be engaged by the flight control computer of the aircraft in response to a parameter exceeding or falling below a predetermined threshold. Non-limiting examples of such parameters include atmospheric particulate density, airspeed or engine operational status. In other embodiments, bypass door actuator 138 may including one or more spring elements such that bypass door 134 operates as a spring loaded bypass door with the spring elements biases bypass door 134 to the closed door position. Such a spring loaded bypass door may move to the open position when airflow against the spring loaded bypass door exceeds a predetermined threshold. The spring elements may be used in addition to or in lieu of other mechanical and/or electrical components of bypass door actuator 138. In yet other embodiments, bypass door 134 may be slidably, instead of rotatably, coupled to outer wall 106 to cover or expose bypass slot 132.

Aft end 122 of air filter assembly 100 forms a concave inlet port interface edge 140 that is shaped to complement the convex edge of an aircraft inlet port. Concave inlet port interface edge 140 may include a contour horn 142 to provide an aerodynamic surface at the upper aft end 122 of air filter assembly 100 when installed on an air inlet. A seal 144 extends aft of the aft edges of inner and outer walls 104, 106. Seal 144 is insertable into the inlet port of an air duct. Seal 144 may have any shape that contours the inlet port of the air duct including a polygonal, elliptical, irregular or custom shape. The aft end of outer wall 106 includes a lip 146 that may be used to latch or secure air filter assembly 100 against an inlet port when air filter assembly 100 is installed. Air filter frame 102 and bypass door 134 may be formed from any material sufficient to withstand flight loads while allowing for a secure interface with the skin and inlet port of an aircraft. For example, air filter frame 102 or bypass door 134 may be formed from a metallic or composite material. In another example, air filter frame 102 or bypass door 134 may be formed from an elastomeric or resilient material such as rubber to facilitate the forming of a seal with the skin and inlet port of an aircraft while reducing damage such as scratching to these aircraft components.

Figure 3A:
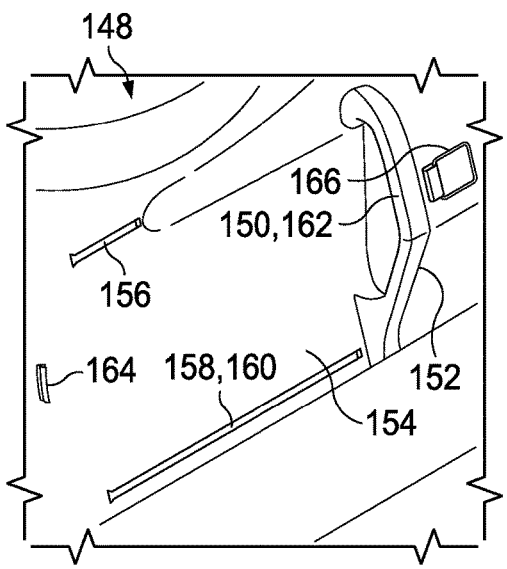
FIGS. 3A-3D are schematic illustrations of a removable air filter assembly in a sequential installation and operational scenario in accordance with embodiments of the present disclosure.

Referring to FIGS. 3A-3D in the drawings, a sequential installation and operation scenario for air filter assembly 100 is depicted. FIG. 3A shows a portion of the air intake system for aircraft 148 including inlet port 150 of air duct 152. Air duct 152 supplies air to the engine of aircraft 148. Skin 154 of aircraft 148 forms upper and lower alignment grooves 156, 158. It will be appreciated by one of ordinary skill in the art that the shape, size and orientation of aircraft 148, inlet port 150, air duct 152 and aircraft skin 154 may vary and that air filter assembly 100 may be sized, shaped or oriented to accommodate such variations.

Figure 3B:
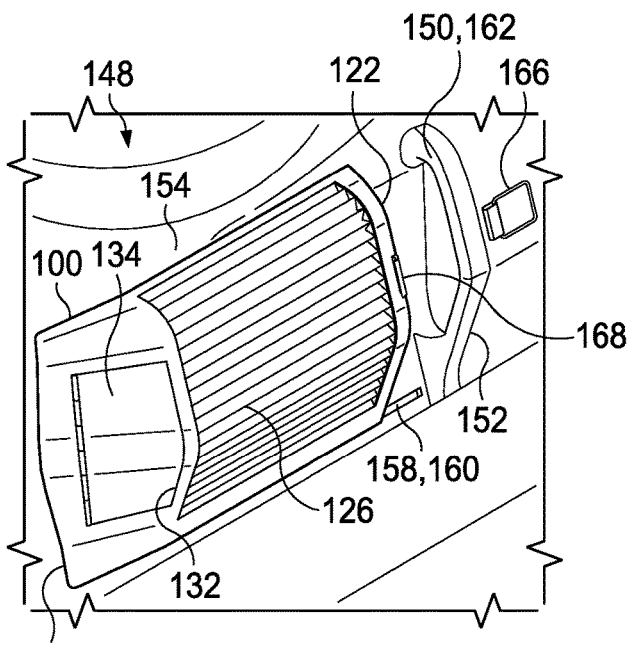

FIG. 3B shows air filter assembly 100 being slid into an installed position along alignment grooves 156, 158, which, along with alignment tabs 116, 118 shown in FIGS. 2A-2F, form alignment tab and groove subsystem 160. More particularly, alignment tabs 116, 118 fit into and slide along alignment grooves 156, 158 to align air filter assembly 100 with inlet port 150, ensuring a snug and secure fit between these two components. Alignment tab and groove subsystem 160 also reduces or prevents undesirable shaking or movement of air filter assembly 100 during operation. Inlet port 150 forms a convex filter interface edge 162 that complements concave inlet port interface edge 140 to provide a secure and sealed fit between aft end 122 of air filter assembly 100 and inlet port 150. In other embodiments, inlet port interface edge 140 may be convex and filter interface edge 162 may be concave or both interface edges 140, 162 may be flat.

Figure 3C:
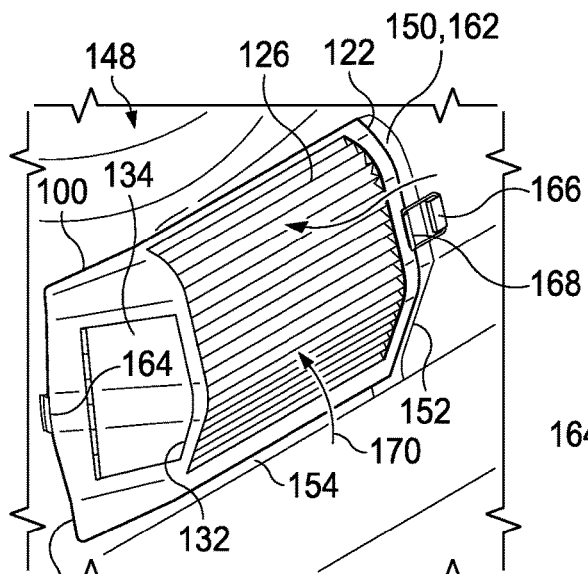

FIG. 3C shows air filter assembly 100 installed and secured on inlet port 150. In the installed position, seal 144 on aft end 122 of air filter assembly 100, shown in FIGS. 2A-2F, is inserted into inlet port 150. Forward and aft locks 164, 166 interface with forward and aft ends 120, 122 of air filter assembly 100, respectively, to secure air filter assembly 100 against inlet port 150 and aircraft skin 154. Locks 164, 166 may be latches such as quick connect latches, screw latches such as quarter-turn screws, quick connect fasteners or any other type of securing mechanism. In the illustrated example, forward lock 164 is a lip or ledge that acts as a positive locking feature to prevent air filter assembly 100 from sliding forward during operation. Forward lock 164 securely snaps onto forward end 120 of air filter assembly 100 when air filter assembly 100 is installed. Aft lock 166 is a latch on the outer surface of air duct 152 at or near inlet port 150 that hooks onto lip 168 to pull and secure air filter assembly 100 against inlet port 150. The latch of aft lock 166 may be flipped manually or by an actuator controlled by the pilot, crew or flight control computer. Air filter assembly 100 also interfaces with aircraft skin 154 by sealing edges 110 of cutout 108 (illustrated in FIGS. 2A-2F) against aircraft skin 154 to form air plenum 114 inside of air filter assembly 100. Aircraft skin 154 thus provides one of the walls that defines air plenum 114.

Figure 3D:
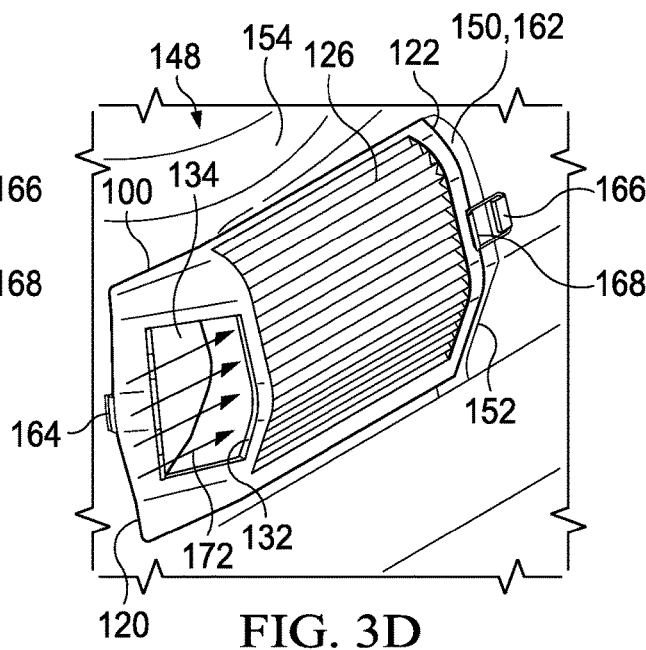

FIG. 3C shows bypass door 134 in the closed door position, forcing air to flow to inlet port 150 of air duct 152 via air filter 126 as indicated by airflow arrows 170. In FIG. 3D, bypass door 134 has rotated into the open door position to allow air to flow to inlet port 150 of air duct 152 via bypass slot 132 as indicated by airflow arrows 172. When bypass door 134 opens, air bypasses air filter 126 to permit increased airflow to the engine of aircraft 148. It will be appreciated by one of ordinary skill in the art that bypass door 134 may be sized smaller, larger or the same and shaped similarly or differently from inlet port 150 to allow a desired amount of airflow 172 to the engine of aircraft 148. Bypass door 134 may also be rotated into intermediate positions between the closed door position shown in FIG. 3C and the open door position shown in FIG. 3D to pass a controlled amount of air to the engine of aircraft 148. Bypass door 134 opens toward aircraft skin 154 in the open door position, although in other embodiments bypass door 134 may rotate, slide or otherwise open in other directions. Bypass door 134 may also be opened and closed in a variety of ways such as by using a bypass door actuator or spring as described in FIGS. 2A-2F. In one non-limiting example, the bypass door actuator or spring may be engaged to open bypass door 134 if airflow 172 or forward airspeed exceeds a predetermined threshold. Bypass door 134 may also be opened when the altitude of aircraft 148 exceeds a predetermined altitude threshold. In one example of the operation of air filter assembly 100, bypass door 134 may be closed as shown in FIG. 3C when aircraft 148 is taking off, flying slow or flying at low altitudes. Bypass door 134 may then be opened as shown in FIG. 3D when the forward airspeed of aircraft 148 exceeds a speed threshold. Because air filter assembly 100 may be conveniently installed and removed using alignment tab and groove subsystem 160, air filter assembly 100 may be removed prior to missions with higher anticipated velocities and installed prior to missions in which high particulate environments are anticipated.

Figure 4A:
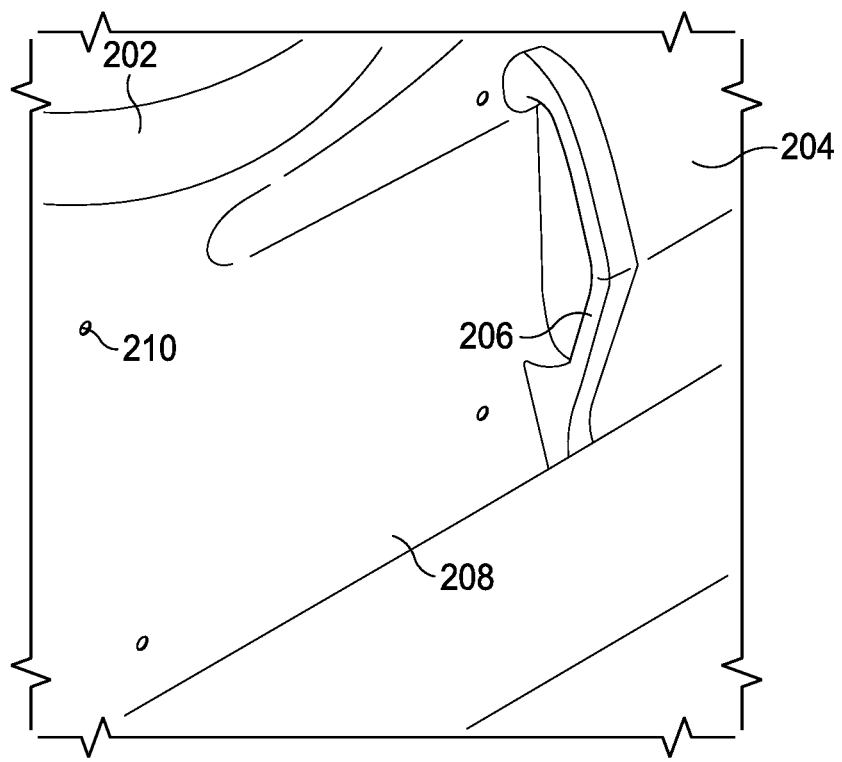
FIGS. 4A-4B are schematic illustrations of a removable air filter assembly in a sequential installation scenario utilizing fasteners in accordance with embodiments of the present disclosure.
Figure 4B:
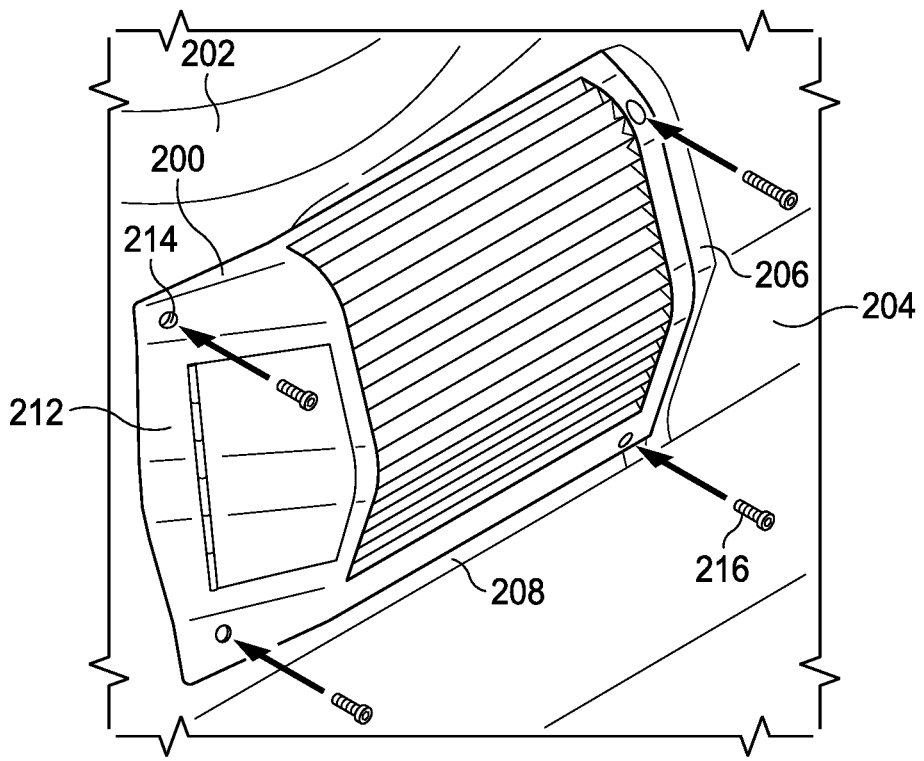

Referring to FIGS. 4A-4B in the drawings, a sequential installation scenario for air filter assembly 200 is schematically illustrated. FIG. 4A shows a portion of an air intake system that supplies air to the engine of aircraft 202. The air intake system includes air duct 204 having inlet port 206. Skin 208 of aircraft 202 forms holes 210, which may be threaded or unthreaded. In FIG. 4B, air filter assembly 200 has been installed on inlet port 206. Air filter frame 212 forms holes 214 that align with holes 210 in aircraft skin 208 when air filter assembly 200 is installed. Fasteners 216 are inserted into holes 214 of air filter frame 212 and holes 210 of aircraft skin 208 to secure air filter assembly 200 against aircraft 202. Fasteners 216 may be unthreaded fasteners such as pins or threaded fasteners such as screws. Holes 210, 214 and fasteners 216 may be used in lieu of or in addition to alignment tab and groove subsystem 160 and locks 164, 166 shown in FIGS. 2A-2F and 3A-3D. Fasteners 216 may be inserted and removed by the pilot or crew so that air filter assembly 200 may be conveniently removed and installed.

Figure 5:
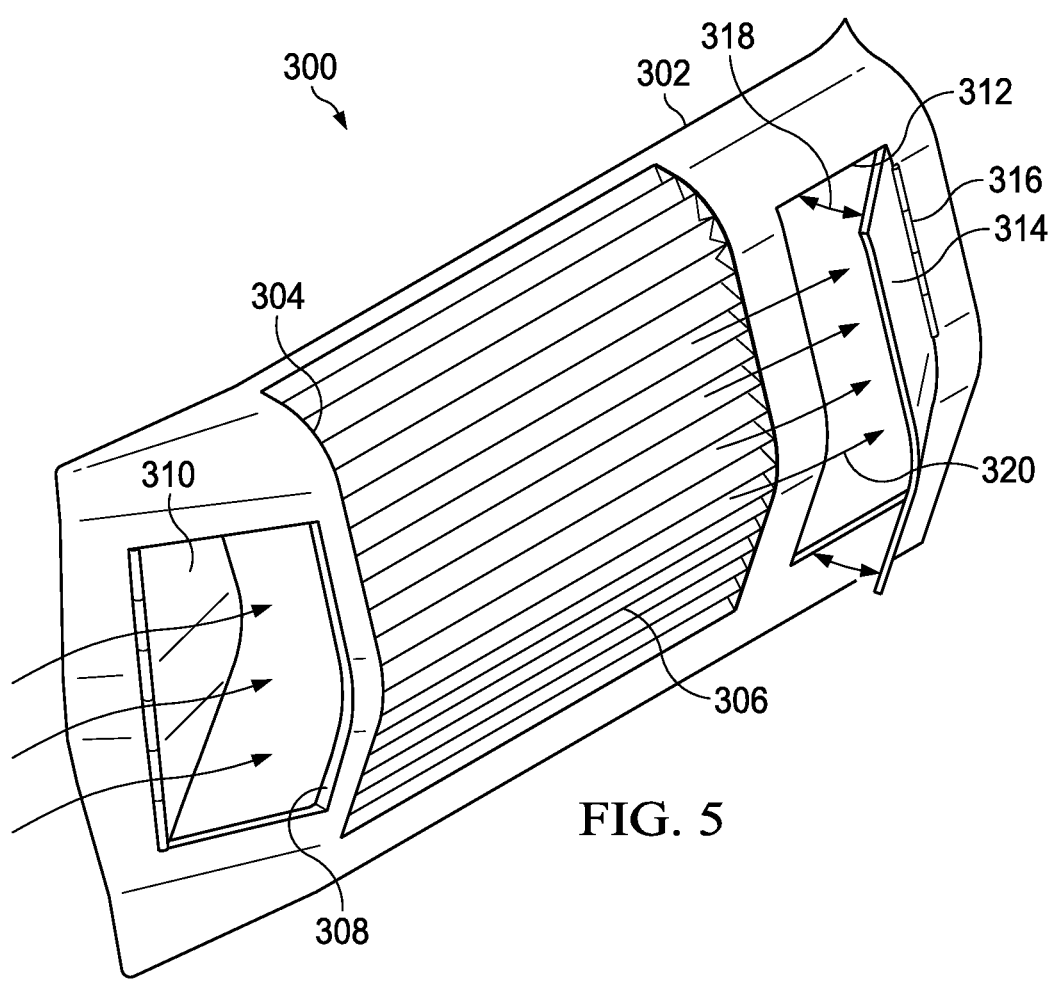
FIG. 5 is an isometric view of a removable air filter assembly having forward and aft bypass doors in accordance with embodiments of the present disclosure.

Referring to FIG. 5 in the drawings, an air filter assembly for the air intake system of an aircraft is schematically illustrated and generally designated 300. Air filter assembly 300 includes air filter frame 302. Air filter frame 302 forms air filter slot 304 into which air filter 306 is insertable. Air filter frame 302 forms forward bypass door slot 308 to which forward bypass door 310 is hingeably coupled. Forward bypass door slot 308 and forward bypass door 310 are forward of air filter slot 304 and air filter 306. Air filter frame 302 extends in the aft direction to form aft bypass door slot 312. Aft bypass door 314 is hingeably coupled to air filter frame 302 by hinge 316. More particularly, the aft edge of aft bypass door 314 is rotatably coupled to the aft edge of aft bypass door slot 312, allowing aft bypass door 314 to rotate about hinge 316 and open and close along arrows 318. Aft bypass door slot 312 and aft bypass door 314 are located aft of air filter slot 304 and air filter 306. Aft bypass door 314 is shown in the open door position in which aft bypass door 314 rotates away from the aircraft and in the opposite direction as forward bypass door 310 so that aft bypass door 314 may direct or scoop oncoming airflow 320 into the air duct of the aircraft. Thus, when bypassing air filter 306, air filter assembly 300 has two bypass doors 310, 314 at its disposal to ensure that the engine of the aircraft receives sufficient air. Forward bypass door 310 and aft bypass door 314 may be actuated individually so that either or both bypass doors 310, 314 may be open at any given time depending on the desired amount of airflow 320 to direct to the engine.

Figure 6A:
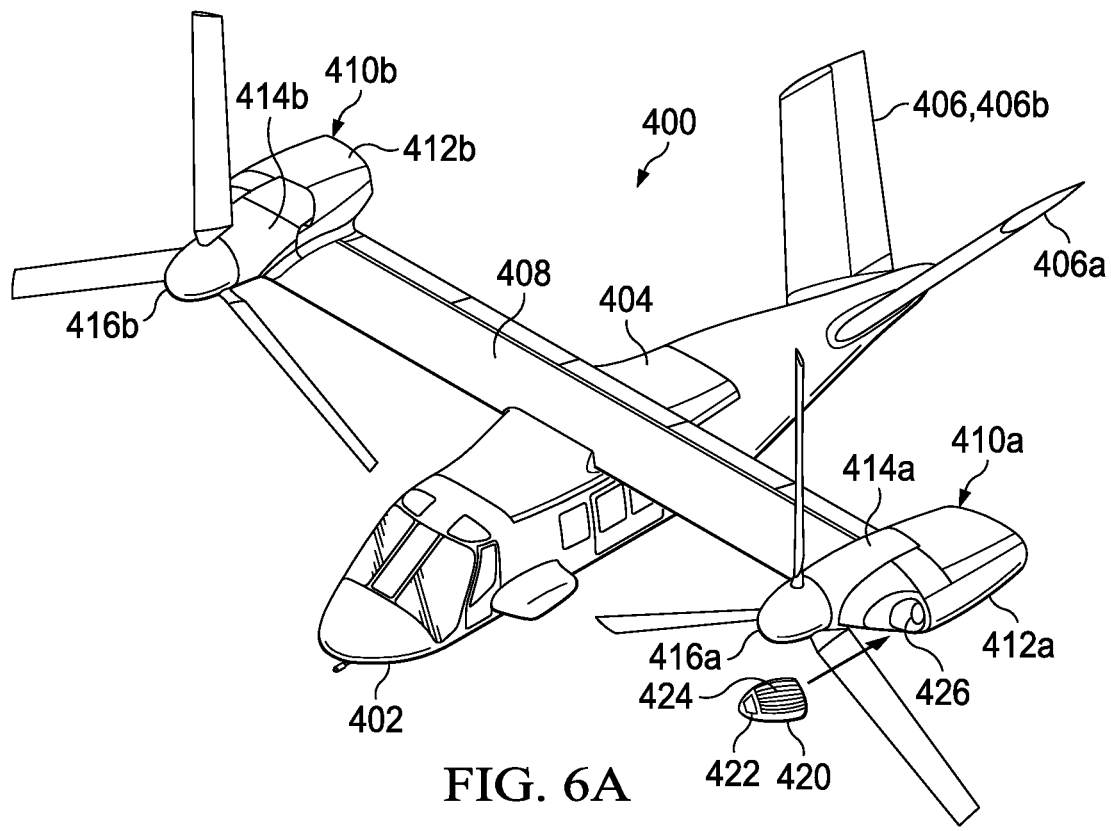
FIGS. 6A-6B are schematic illustrations of a tiltrotor aircraft including a removable air filter assembly in accordance with embodiments of the present disclosure.
Figure 6B:
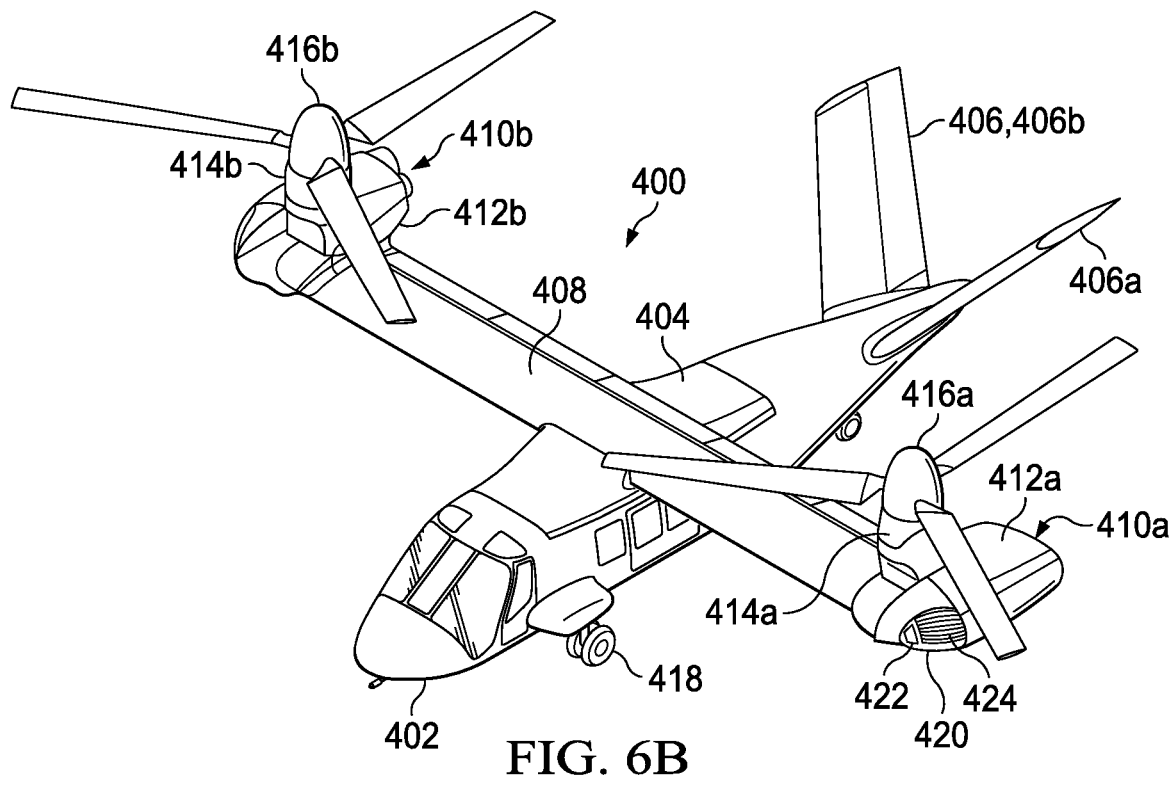

Referring to FIGS. 6A-6B in the drawings, a tiltrotor aircraft is schematically illustrated and generally designated 400. Tiltrotor aircraft 400 includes a fuselage 402, a wing mount assembly 404 and a tail assembly 406 including rotatably mounted tail members 406a, 406b having control surfaces operable for horizontal and/or vertical stabilization during forward flight. A wing member 408 is supported by wing mount assembly 404. Coupled to outboard ends of wing member 408 are propulsion assemblies 410a, 410b. Propulsion assembly 410a includes a nacelle depicted as fixed pylon 412a that houses an engine and a transmission. Thus, the nacelle is fixed relative to wing member 408. In addition, propulsion assembly 410a includes a mast assembly 414a having a mast that is rotatable relative to fixed pylon 412a, wing member 408 and fuselage 402 between a generally horizontal orientation, as best seen in FIG. 6A, and a generally vertical orientation, as best seen in FIG. 6B. Propulsion assembly 410a also includes a proprotor assembly 416a, including proprotor blade assemblies radiating therefrom, which is rotatable responsive to torque and rotational energy provided via a rotor hub assembly and drive system mechanically coupled to the engine and transmission housed by fixed pylon 412a. Similarly, propulsion assembly 410b includes a nacelle depicted as fixed pylon 412b that houses an engine and transmission and a mast assembly 414b that is rotatable relative to fixed pylon 412b, wing member 408 and fuselage 402. Propulsion assembly 410b also includes a proprotor assembly 416b, including proprotor blade assemblies radiating therefrom, which is rotatable responsive to torque and rotational energy provided via a rotor hub assembly and drive system mechanically coupled to the engine and transmission housed by fixed pylon 412b.

FIG. 6A illustrates tiltrotor aircraft 400 in airplane or forward flight mode, in which proprotor assemblies 416a, 416b are rotating in a substantially vertical plane to provide a forward thrust enabling wing member 408 to provide a lifting force responsive to forward airspeed, such that tiltrotor aircraft 400 flies much like a conventional propeller driven aircraft. FIG. 6B illustrates tiltrotor aircraft 400 in helicopter or vertical takeoff and landing (VTOL) flight mode, in which proprotor assemblies 416a, 416b are rotating in a substantially horizontal plane to provide a lifting thrust, such that tiltrotor aircraft 400 flies much like a conventional helicopter. It should be appreciated that tiltrotor aircraft 400 can be operated such that proprotor assemblies 416a, 416b are selectively positioned between forward flight mode and VTOL flight mode, which can be referred to as a conversion flight mode. Even though tiltrotor aircraft 400 has been described as having one engine in each fixed pylon 412a, 412b, it should be understood by those having ordinary skill in the art that other engine arrangements are possible and are considered to be within the scope of the present disclosure including, for example, having a single engine which may be housed within fuselage 402 that provides torque and rotational energy to both proprotor assemblies 416a, 416b. Tiltrotor aircraft 400 also includes a landing gear system 418.

Air filter assembly 420 including bypass door 422, interchangeable air filter 424 and other features as described in the illustrative embodiments may be conveniently removed from and installed onto air intake system 426 of propulsion assembly 410a. Air filter assembly 420 may be secured to air intake system 426 using features similar to those described with respect to air filter assembly 100 in FIGS. 2A-2F and 3A-3D such as an alignment tab and groove subsystem or locks. An air filter assembly may also be installed on the air intake system of propulsion assembly 410b. The implementation of air filter assembly 420 on tiltrotor aircraft 400 is illustrative of the wide range of aircraft on which air filter assembly 420 may be utilized.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. An air intake system for an engine of an aircraft, the air intake system comprising:
    an air duct having an inlet port, the air duct providing fluid communication between the inlet port and the engine; and
    a removable air filter assembly configured to interface with the inlet port of the air duct and a skin of the aircraft, the removable air filter assembly including:
    an air filter frame having an outer wall and an inner wall, the outer wall of the air filter frame forming an air filter slot;
    a bypass door forward of the air filter slot of the air filter frame;
    an air filter insertable into the air filter slot of the air filter frame; and
    an air plenum formed by the walls of the air filter frame, the air filter and the skin of the aircraft;
    wherein, the bypass door is movable between a plurality of door positions including a closed door position and an open door position, air flowing to the inlet port of the air duct via the air filter in the closed door position and bypassing the air filter in the open door position.

2. The air intake system as recited in claim 1 wherein the inlet port of the air duct forms a convex filter interface edge and an aft end of the removable air filter assembly forms a concave inlet port interface edge.

3. The air intake system as recited in claim 1 wherein the inner wall of the air filter frame forms a cutout including one or more edges configured to couple to the skin of the aircraft to at least partially form the air plenum.

4. The air intake system as recited in claim 3 wherein the removable air filter assembly further comprises a seal at the one or more edges of the cutout configured to seal the removable air filter assembly against the skin of the aircraft.

5. The air intake system as recited in claim 1 wherein the outer wall of the air filter frame forms a bypass slot, the bypass door coupled to the bypass slot, and wherein air flows to the inlet port of the air duct via the bypass slot in the open door position.

6. The air intake system as recited in claim 1 wherein the bypass door opens toward the skin of the aircraft in the open door position.

7. The air intake system as recited in claim 1 wherein the bypass door is rotatably coupled to the outer wall of the air filter frame by a hinge at a forward end of the bypass door.

8. The air intake system as recited in claim 1 wherein the removable air filter assembly further comprises a bypass door actuator configured to move the bypass door between the plurality of door positions.

9. The air intake system as recited in claim 1 wherein the bypass door further comprises a spring loaded bypass door biased to the closed door position, the spring loaded bypass door moving to the open door position when airflow against the spring loaded bypass door exceeds a threshold.

10. The air intake system as recited in claim 1 wherein the removable air filter assembly further comprises an aft bypass door aft of the air filter slot.

11. The air intake system as recited in claim 1 wherein the removable air filter assembly further comprises an aft seal insertable into the inlet port of the air duct.

12. The air intake system as recited in claim 1 further comprising a lock configured to interface with a forward end of the removable air filter assembly to secure the removable air filter assembly against the inlet port.

13. The air intake system as recited in claim 1 further comprising a lock configured to interface with an aft end of the removable air filter assembly to secure the removable air filter assembly against the inlet port.

14. The air intake system as recited in claim 1 further comprising an alignment tab and groove subsystem configured to align the removable air filter assembly with the inlet port of the air duct.

15. The air intake system as recited in claim 14 wherein the inner wall of the air filter frame includes one or more alignment tabs and the skin of the aircraft forms one or more alignment grooves, the one or more alignment tabs slidable along the one or more alignment grooves.

16. An aircraft comprising:
    an airframe having a skin;
    an engine disposed within the airframe; and
    an air intake system configured to receive air for the engine, the air intake system comprising:
    an air duct having an inlet port, the air duct providing fluid communication between the inlet port and the engine; and
    a removable air filter assembly configured to interface with the inlet port of the air duct and the skin of the airframe, the removable air filter assembly including:
    an air filter frame having an outer wall and an inner wall, the outer wall of the air filter frame forming an air filter slot;

a bypass door forward of the air filter slot of the air filter frame;
an air filter insertable into the air filter slot of the air filter frame; and
an air plenum formed by the walls of the air filter frame, the air filter and the skin of the airframe;
wherein, the bypass door is movable between a plurality of door positions including a closed door position and an open door position, air flowing to the inlet port of the air duct via the air filter in the closed door position and bypassing the air filter in the open door position.

17. The aircraft as recited in claim 16 wherein the aircraft is a helicopter including a fuselage and a main rotor system powered by the engine, the air duct coupled to the fuselage.

18. The aircraft as recited in claim 16 wherein the aircraft is a tiltrotor aircraft including a fuselage supporting a wing having outboard ends and a nacelle including the engine and the air duct coupled to one of the outboard ends of the wing.

19. The aircraft as recited in claim 16 wherein the removable air filter assembly is shaped to contour the skin of the airframe.

\* \* \* \* \*